United States Patent [19]

Burke et al.

[11] Patent Number: 5,455,772
[45] Date of Patent: Oct. 3, 1995

[54] METHOD OF AND APPARATUS FOR TESTING AN ENGINE OR A COMPRESSOR

[75] Inventors: David Burke, Carleton Rise; Giles Muddell, Norwich, both of United Kingdom

[73] Assignee: Lotus Cars Limited, United Kingdom

[21] Appl. No.: 39,256

[22] PCT Filed: Oct. 16, 1991

[86] PCT No.: PCT/GB91/01805

§ 371 Date: Apr. 15, 1993

§ 102(e) Date: Apr. 15, 1993

[87] PCT Pub. No.: WO92/07175

PCT Pub. Date: Apr. 30, 1992

[30] Foreign Application Priority Data

Oct. 16, 1990 [GB] United Kingdom ............... 9022439

[51] Int. Cl.⁶ ............................................ G01M 15/00
[52] U.S. Cl. .................. 364/431.01; 364/431.07;
364/431.1; 364/511; 123/90.12; 123/90.15;
123/90.16; 123/321; 137/522; 137/512.3;
137/494; 137/543.13
[58] Field of Search ............... 364/431.01–431.12,
364/511; 123/425, 73 A–73 R, 90.13, 90.12,
90.16, 90.19, 372, 386, 486, 198 F, 478,
321, 90.11–90.15; 73/46, 49.8, 239, 119;
137/522, 543.13, 494, 512.3, 625.5; 60/329;
251/30.05, 129.04, 30.04, 31

[56] References Cited

U.S. PATENT DOCUMENTS

| Re. 33,052 | 9/1989 | Meistrick et al. | 123/321 |
|---|---|---|---|
| 3,682,152 | 8/1972 | Muller-Berner | 123/478 |
| 3,844,528 | 10/1974 | Massie | 251/30.04 |
| 3,858,607 | 1/1975 | Baker | 251/282 |
| 4,009,695 | 3/1977 | Ule | 123/90.13 |
| 4,150,640 | 4/1979 | Egan | 123/97 B |
| 4,193,742 | 3/1980 | Fischer et al. | 417/295 |
| 4,206,728 | 6/1980 | Trenne | 123/90.12 |
| 4,296,672 | 10/1981 | Inhofer | 91/271 |
| 4,593,658 | 6/1986 | Moloney | 123/90.11 |
| 4,898,206 | 2/1990 | Meistrick et al. | 137/512.3 |
| 4,949,751 | 8/1990 | Meistrick et al. | 137/522 |
| 4,974,495 | 12/1990 | Richeson, Jr. | 91/459 |

FOREIGN PATENT DOCUMENTS

| 0143128 | 6/1985 | European Pat. Off. . |
| 3537630A1 | 4/1986 | Germany . |
| 3833459A1 | 4/1990 | Germany . |
| 59-170414 | 9/1984 | Japan . |
| 60-85208 | 5/1985 | Japan . |
| 513554 | 5/1928 | Switzerland . |
| 60-95115 | 5/1985 | United Kingdom . |
| 2122257 | 4/1986 | United Kingdom . |

*Primary Examiner*—Kevin J. Teska
*Assistant Examiner*—Jacques H. Louis-Jacques
*Attorney, Agent, or Firm*—Westman, Champlin & Kelly

[57] ABSTRACT

A method of and apparatus for testing an engine or compressor wherein one of an inlet and an exhaust valve (19) is actuated by a hydraulic piston and cylinder arrangement (11) and the flow of hydraulic fluid to the piston and cylinder arrangement (11) is controlled, provides variation of the motion of the valve (19) by adjustment of a control (14, 10) for controlling the hydraulic fluid. Preferably the control is programmed such that the motion of the valve (11) corresponds to the motion that would result from the use of a particular camshaft in the engine or compressor to control valve motion.

15 Claims, 5 Drawing Sheets

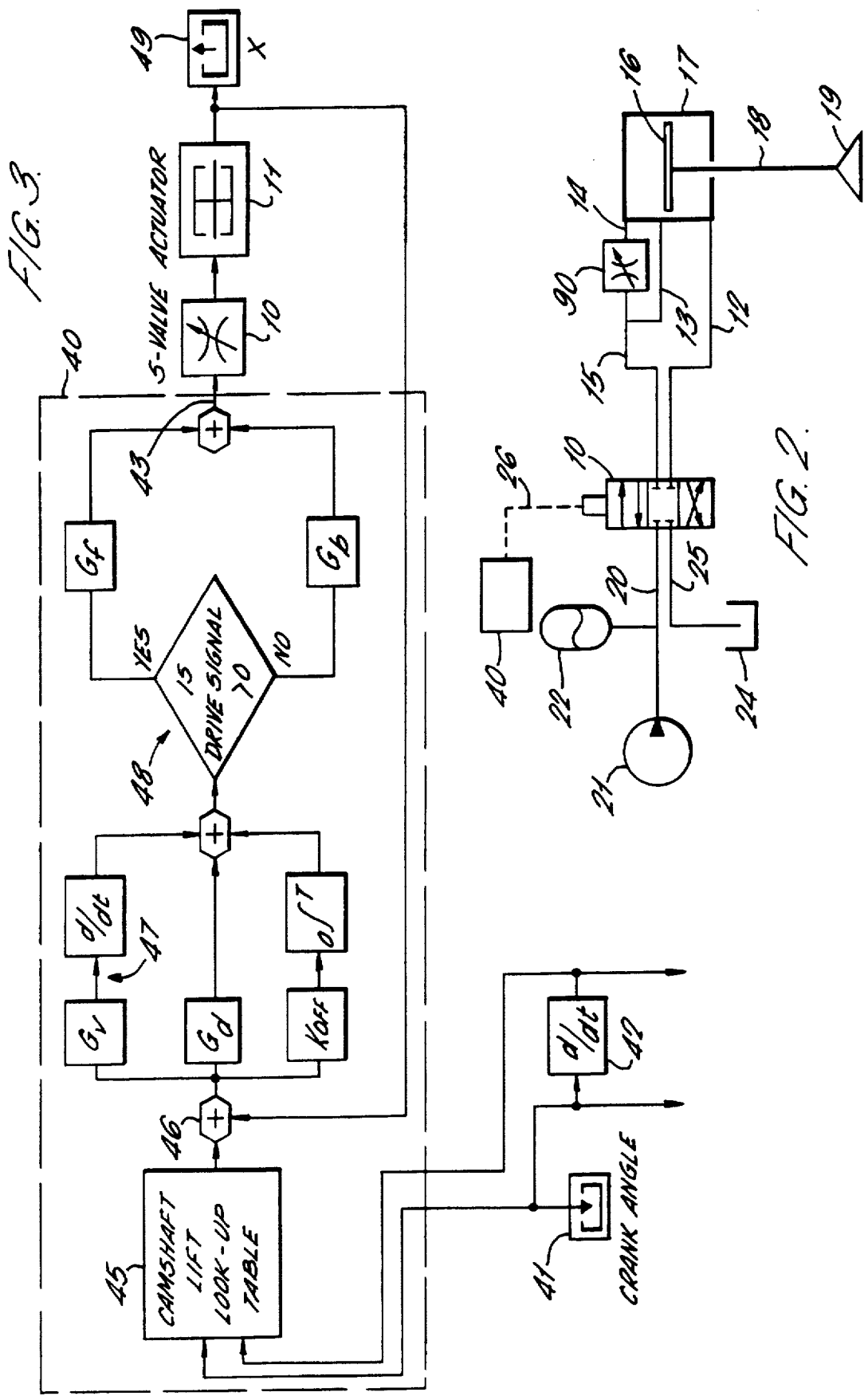

5,455,772

METHOD OF AND APPARATUS FOR TESTING AN ENGINE OR A COMPRESSOR

The invention relates to a method of testing an engine or a compressor. The invention also relates to apparatus used in the method.

The present invention will be discussed with reference to its application to a reciprocating internal combustion engine. However, the invention should not be considered limited to such an application since it can be equally well applied to any type of engine or compressor which uses valves to control flow of fluid and/or gas (e.g. a reciprocating compressor).

The motion of valve gear at the cylinder head is normally controlled by the rotation of one or more cam shafts. The cam shafts act to open and close the inlet and exhaust valves of the internal combustion engine. The timing of the opening and closing of the valves is determined by the profile of the cam shaft. Different cam shaft profiles are chosen for different engines. The profile of the cam shaft has a large impact on the efficiency and performance of an engine.

Generally different cam profiles are tested on a test bed arrangement. In each instance a cam shaft with a particular profile must be machined and then connected in the internal combustion engine before the particular cam profile can be tested. This is a long and costly process. The present invention provides means by which this process can be made more cost effective and can be speeded considerably.

The present invention provides a method of testing an engine or compressor wherein an inlet and/or exhaust valve is actuated by a hydraulic piston and cylinder arrangement and the flow of hydraulic fluid to the piston and cylinder arrangement is controlled, variation of the motion of the valve being achieved by adjustment of the control means for controlling the hydraulic fluid.

Preferably the control means for controlling the hydraulic fluid are programmed such that the motion of the valve corresponds to the motion that would result from the use of a particular camshaft in the engine or compressor to control valve motion.

Preferably the programming of the control means is varied during testing of the engine or compressor such that the motion of the valve is varied to correspond to the motion that would result from the use of various different camshafts in the engine or compressor.

The invention also provides apparatus for testing an engine or compressor comprising valve control apparatus for controlling valve means which opens and closes an inlet or exhaust port of the engine or compressor, which valve control apparatus comprises; an actuator which comprises a piston within a cylinder, which piston is connected either directly or indirectly to the valve means such that motion of the piston causes motion of the valve means; processing means for deriving the stroke position of the engine or compressor; position measurement means for measuring directly or indirectly the position of the piston within the actuator cylinder; and control means for controlling the actuator by controlling the flow of fluid or gas into at least one of the chambers defined by the surfaces of the piston and the interior surface of the cylinder; wherein the control means controls the actuator to cause the valve means to open and close the port and wherein the control means operates with regard to the stroke position of the engine or compressor and in accordance with a programme of instructions provided by the user of the apparatus, which programme of instructions can be altered by the user as required.

Preferably a programme of instructions is provided by the user such that the motion of the valve means corresponds to the motion that would result from the use of a particular camshaft in the engine or compressor to control valve motion.

Preferably the control means for controlling the actuator comprises electrical or electronic processing means and a control valve controlled by the processing means by the use of electrical control signals, which control valve can connect at least one of the chambers of the actuator to a source of pressurised fluid or pressurised gas or to an exhaust for fluid or for gas.

Preferably the processing means controls the control valve by use of a closed loop position or velocity feedback control system wherein the feedback signal is derived from the signal produced by the displacement transducer.

Preferably the position measuring means for measuring the position of the piston with respect to the actuator cylinder comprises a displacement transducer connected to the piston which provides an electrical signal indicative of the said relative position.

Preferably the apparatus additionally comprises processing means for producing an electrical signal representative of the operational speed of the engine or compressor. The processing means for producing a signal representative of the operational speed of the engine or compressor preferably comprises means for differentiating the signal representative of the stroke position of the engine or compressor. Preferably the apparatus of the invention has processing means which controls the control valve having regard to the operational speed of the engine or compressor as indicated by the electrical signal.

In one embodiment the control means of the apparatus controls the flow of fluid or gas into both of the chambers defined by the two surfaces of the piston and the interior surface of the cylinder.

Preferably the apparatus of the invention comprises resistance means which increases the resistance offered to the flow of fluid or gas out of the actuator as the actuator piston approaches at least one end of the cylinder.

The invention further provides a method of testing an engine or compressor comprising the steps of;

providing apparatus as hereinbefore described, programming the apparatus with a programme of instructions which will cause an exhaust or inlet valve to move under the control of the actuator in a manner corresponding to the motion that would result from the use of a particular camshaft in the engine or compressor and operating the engine or compressor with the apparatus installed and controlling the motion of the valve in accordance with the programme of instructions.

Preferred embodiments of the present invention will be described with reference to the accompanying drawings in which;

FIG. 2 is a schematic representation of a portion of the apparatus including a pump, a reservoir, a control valve, the hydraulic actuator and the engine valve.

FIG. 3 is a schematic representation of the control system of the apparatus.

Figure 1:
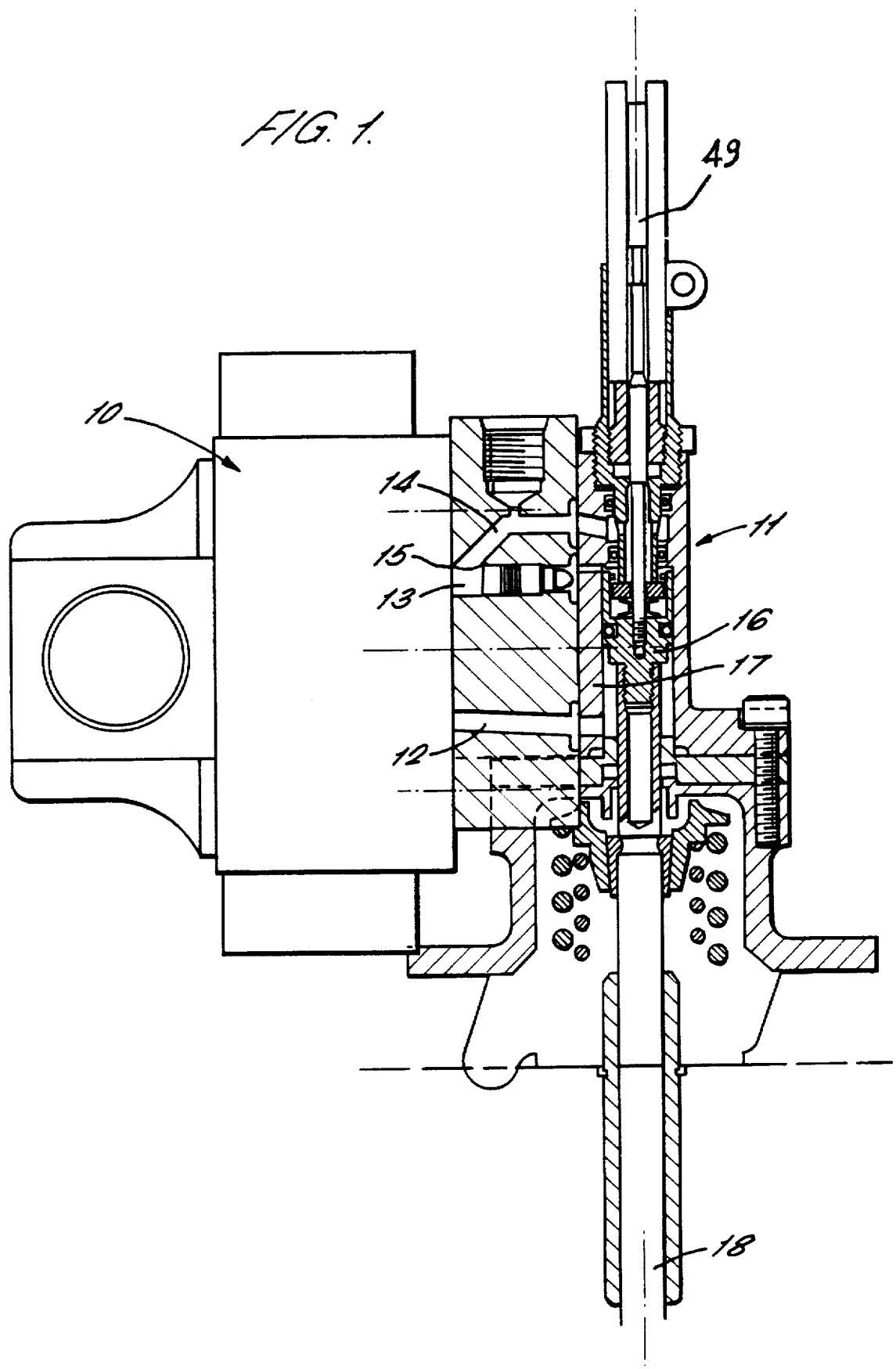
FIG. 1 is a part cross-section through a portion of the apparatus including the hydraulic actuator and the control valve.

Referring to FIG. 1 the apparatus can be seen to comprise a control valve 10 and a hydraulic actuator 11 connected to the control valve 10 by three passages 12, 13 and 14. Passages 13 and 14 are joined together at a point 15.

The actuator 11 comprises a piston 16 movable within a cylinder defined by the walls 17. The piston 16 is directly connected by a rod 18 to a valve (not shown in FIG. 1) which opens and closes an aperture opening onto a cylinder of an internal combustion engine.

The apparatus also includes a displacement measurement device 49, such as an LVDT (Linear Variable Differential Transformer) or a Hall Effect Transducer, connected to the piston 16 for measurement of the relevant displacement of the piston 16 with respect to the cylinder 17.

The control valve 10 is a standard control valve. In the preferred embodiment in a engine with a maximum revolutionary speed of 7,000 rpm the valve has a frequency response of 350 Hz.

The arrangement can be seen schematically in FIG. 2. The hydraulic actuator 17 is shown schematically as a cylinder comprising a piston 16 connected by the rod 18 to the valve 19. The piston 16 is caused to move with respect to the cylinder 17 by supplying fluid under pressure through the two pipes 15 and 12 to both sides of the piston 16.

The control valve 10 is shown schematically in FIG. 2 with two control ports connected to lines 15 and 12, a pressure port connected to line 20 and a return port connected to line 25. The pressure port 20 is connected via the line 20 to a pump 2 1 and a reservoir 22. The control valve 10 supplies pressurised fluid to either line 15 or 12 depending upon an input signal received from via the line 26 from the processing means 40. When one line is so connected the other line is connected by the control valve 10 to the exhaust 24 via the line 25.

Figure 4:
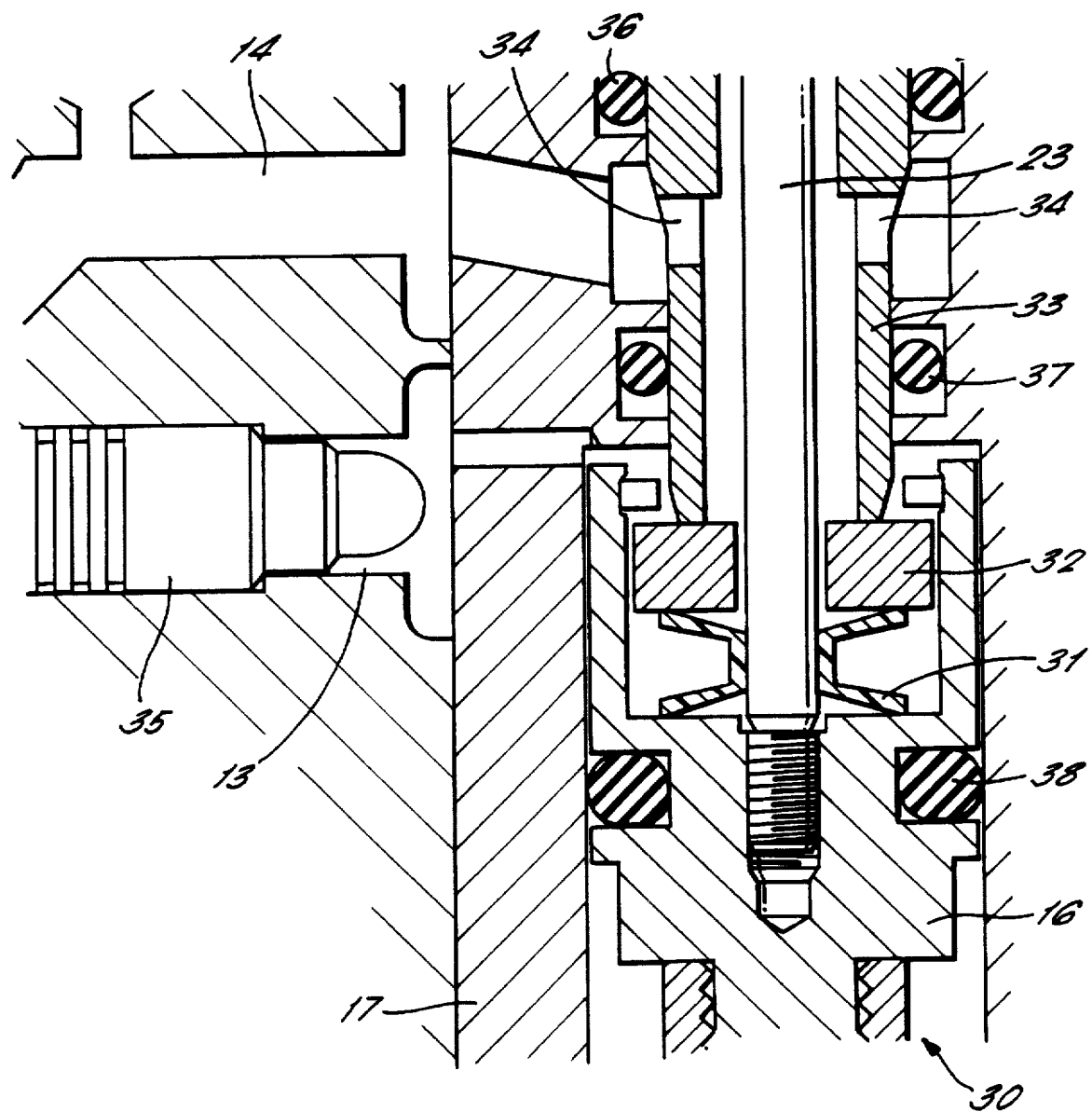
FIG. 4 is a cross-section of part of the hydraulic actuator of the apparatus.

An expanded cross-sectional view of part of the hydraulic actuator 11 is shown in FIG. 4. In FIG. 4 there can be seen the two tubes 13 and 14 the rod 23 of the displacement measurement device 49, the piston 16 and the cylinder defined by the walls 17. Circular seals 36, 37 and 38 are provided to prevent hydraulic fluid from passing from one compartment to another.

The FIG. 4 shows clearly an arrangement which forms the resistance means of one embodiment of the invention. The resistance is shown schematically at 90 in FIG. 2. The purpose and method of operation of the resistance means shall be hereinafter described. The resistance means of the first embodiment of the invention comprises an annular ring of deformable resilient material 31, an annular washer 32 and a sleeve 33. The sleeve 33 surrounds the rod 23 of the displacement measurement device 19. The sleeve 33 has a series of apertures 34 therein which allow communication of the inside of the sleeve with the outside thereof. Another important integer in the resistance means is an orifice formed by a nozzle 35.

The control system of the apparatus can be seen in FIG. 3. The processing means of the apparatus is contained within the dotted line 40. From FIG. 3 it can be seen that there are three inputs to the processing means. The first of these inputs is an electrical signal corresponding to the crank angle. The crank angle is measured at 41. The crank angle signal corresponds to an instantaneous measurement of the angle that the crankshaft makes with an arbitrary fixed reference. This signal gives an indication of the stroke position of the engine; that is to say an indication of the relative displacement of the working pistons to the working cylinders of the engine. Many alternatives to crankshaft position measurement could be used, for instance measurements taken from the timing mechanism of the engine.

The instantaneous stroke position measurement is differentiated at 42 to give the speed of revolution of the engine in revolutions per minute. This parameter forms another input into the processing means 40. The crank angle measurement and the RPM measurement are used not only by the processing means but can also used by processing means for controlling ignition timing and fuel injection.

The third input to the processing means 40 is a position measurement. The displacement measurement means 49 measures the position of the actuator piston 16 with respect to the actuator cylinder formed by the walls 17. The position measurement is input to the processing means. The signal is used in the closed loop control system of the processing means 40, the signal providing the necessary feedback loop.

The processing means 40 has one output 43. The output is an electrical signal which controls motion of the control valve 10. The control valve 10 then controls the motion of the piston 16.

The method of operation of the processing means 40 will be hereinafter described, once the physical operation of the actuator 11 has been described.

The method of operation of the control apparatus will now be described with reference to the drawings and with reference to the preceding description of the drawings.

Referring firstly to FIG. 2 of the drawings, the piston 16 can move within the cylinder 17 and is connected via a rod 18 to a valve 19. The valve 19 opens and closes an aperture which opens on to a cylinder of the internal combustion engine. The valve can shut either an inlet port opening on to the cylinder or an exhaust port.

The piston 16 is caused to move within the cylinder 17 by applying a pressure difference thereacross. The pressure difference is applied by supplying hydraulic fluid under pressure to one side of the piston 16, whilst connecting the hydraulic fluid on the other side of the piston 16 to a sink.

The control valve is used to control the motion of the piston 16. If the servo-valve 10 is used to cause the valve 19 to move towards the valve seat then the servo-valve acts to connect the line 12 to line 20. Line 20 receives a supply of hydraulic fluid under pressure from a pump 21 and a reservoir of pressurised hydraulic fluid 22.

Whilst the control valve 10 connects the line 12 to the line 20 to supply hydraulic fluid under pressure to the lower side of the piston 16, the valve also acts to connect line 15 to a sink 24. Sink 24 is a sink for hydraulic fluid and contains fluid at low pressure. By connecting the line 15 to the sink 24 the servo-valve enables fluid to flow from the upper portion of the cylinder 17 through the line 15 and out to the sink 24.

The reservoir of pressurised hydraulic fluid 22 is used to maintain the supply pressure at 20 at an approximately constant value. The pump 21 could be powered by motion of the engine which varies during use of the vehicle and therefore the supply of hydraulic fluid from pump 21 can vary. The reservoir 22 contains a supply of pressurised fluid and acts to stabilise the fluctuations in supply of pressurised hydraulic fluid.

If the test apparatus of the invention is to be used in a static bench test of an engine, then the pressurised hydraulic fluid need not be supplied for a pump powered by the motion of the engine. Instead, the pressurised fluid could be provided by a source external of the engine. Such an external source would be preferable in a static bench test arrangement, since the output parameters measured during the engine test would more closely follow those of an engine using a particular machine cam shaft, no power being lost to the test apparatus. However, even in a static test bench arrangement, a reservoir 22 is required. The reservoir 22 helps to offset problems caused by inertia of the hydraulic fluid. When the control valve 10 opens to require the supply of pressurised hydraulic fluid, a large amount of fluid is required quickly. The hydraulic fluid has inherent inertia. If the supply is restricted to that available in the supply line from the pump 21 then the inertia of the fluid may cause inaccuracies in control, since insufficient fluid may be readily available for supply to the actuator. The reservoir 22 offsets this difficulty by providing a ready supply of pressurised fluid. In practice, the reservoir 22 should be situated as closely as possible to the control valve 10.

Referring to FIG. 1 of the drawings line 12 can be seen to supply the lower half of the hydraulic actuator 11. The line 15 supplies hydraulic fluid to the upper portion of the cylinder 17 through Lines 13 and 14.

In practice the apparatus of the invention has been found to be limited in performance by the frequency response of the control valve 10 and the position measurement means 49. The control system is not sensitive enough to control the decceleration of the engine valve onto the seat of the cylinder head. The problem is enhanced since the fluid contained within the hydraulic actuator is not a perfectly incompressible fluid. The fluid tends to compress under rapid decceleration of the valve. This compression causes inaccuracies in control. Further inaccuracies are caused when the fluid tries to expand, applying pressure to the piston. In effect the compressibility of the fluid within the hydraulic actuator causes "bouncing" of the controlled valve. In order to overcome these difficulties the apparatus includes a resistance means the operation of which shall now be described.

The resistance means only operates during the last portion of the upward stroke of the piston, as the valve approaches the valve seat. As the piston 16 moves away from the engine to bring the valve 19 into contact with its respective valve seat, the non-deformable washer 32 (FIG. 4) contacts the lower end of the sleeve 33. Before such contact hydraulic fluid may flow out of the cylinder 17 through the outlet 14 by passing within the sleeve 33 and through the holes 34 which communicate with an annular space defined within the actuator. When the washer contacts with the sleeve 33 the resilient component 31 deforms to seal against the rod 23 of the displacement measurement means 19. The seal prevents further hydraulic fluid from passing out of the cylinder 17 through the sleeve 33 to the outlet tube 14. Further fluid can only be expelled from the upper portion of the cylinder 17 through the tube 13.

A nozzle 35 is positioned within the tube 13 to provide a restricted aperture. The restricted aperture provides resistance to flow of fluid out of the cylinder 17 as the piston 16 approaches the end of its upward stroke. This resistance effectively damps the motion of the piston 16, slowing the associated motion of the valve towards the valve seat, slowing the valve so that impact between the valve and the valve seat does not occur.

The resistance means also largely eliminates the problem of the valve "bouncing" on the hydraulic fluid within the actuator since the volume of fluid enclosed between the piston 31 and the orifice defined by the nozzle 35 is greatly reduced in comparison to the volume of fluid usually subject to compressing forces. The volume of enclosed fluid must be kept as small as possible to avoid any difficulties caused by the resonant frequency of the enclosed fluid.

After the piston has reached the top of its upward motion and fluid under pressure is supplied to the top half of the piston through the inlet 14 and 13 the resistance means ceases to function, since the hydraulic fluid supplied through 14 can apply pressure to the washer 32 and the piston 16. Unnecessary damping of the motion of the piston 16 within the cylinder 17 is therefore avoided.

Figure 5:
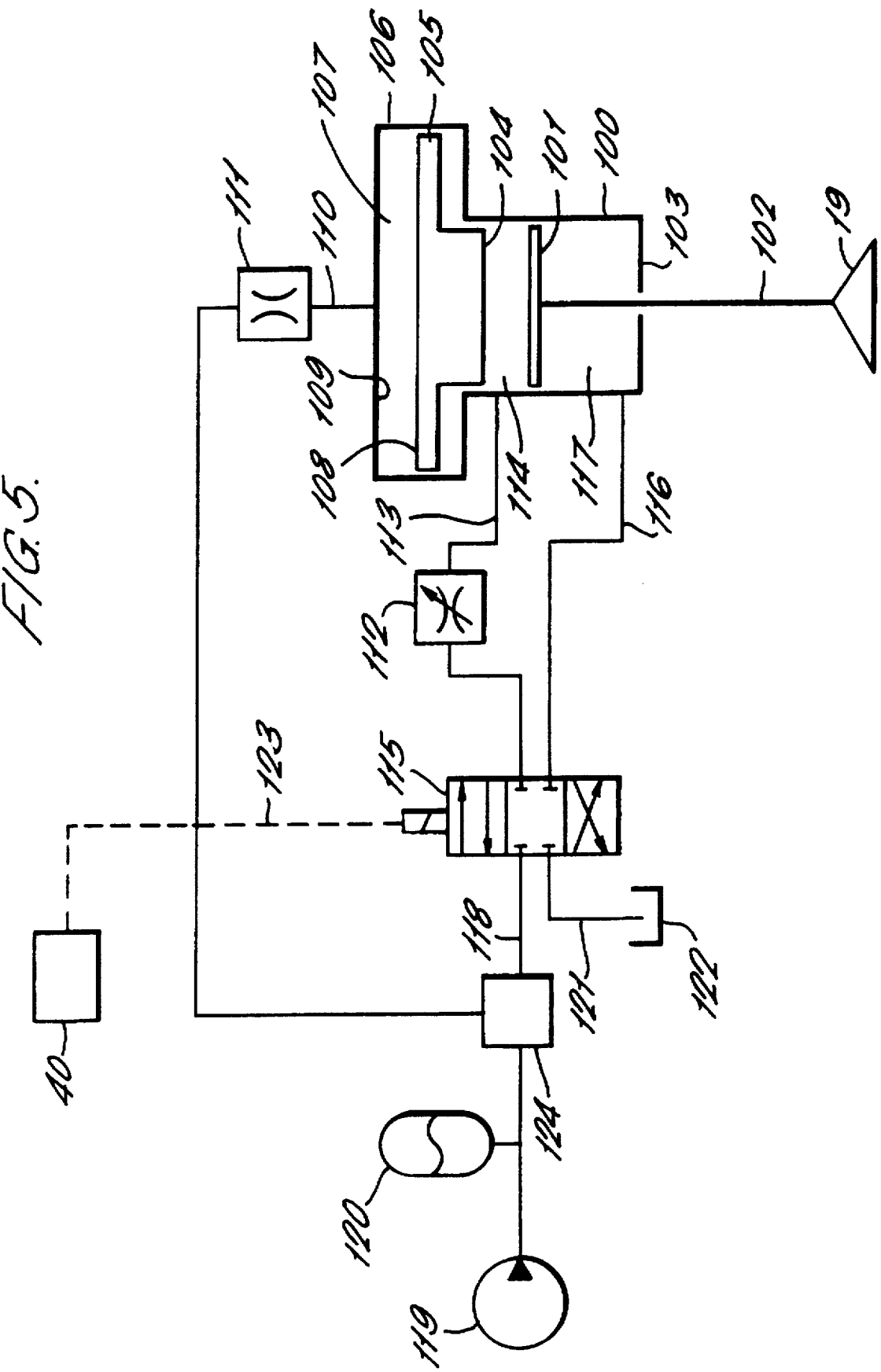
FIG. 5 is a schematic representation of a second embodiment of the apparatus.

An alternative arrangement of the resistance means will now be described with reference to FIGS. 5 and 6. In FIG. 5 there can be seen an alternative embodiment of an actuator 100 for use in the apparatus. The actuator 100 comprises a piston attached by a connecting rod 102 to an inlet or exhaust valve 19 of an engine.

The actuator 100 has one fixed end 103 and one movable end 104. The movable end 104 is connected to a piston 105. In the preferred embodiment described the movable end 104 is formed in one component with the piston 105. The piston 105 is movable within a second cylinder 106. A cavity 107 is defined between the surface 108 of the piston 105 and the uppermost surface 109 of the second cylinder 106. Hydraulic fluid is supplied to the chamber 107 by a line 110. Positioned in the line 110 is an orifice 111.

The resistance means 112 of the second preferred embodiment of the invention is shown schematically in FIG. 5 in the line 113. Line 113 connects the chamber 114 of the actuator 100 to the valve 115. A line 116 connects the lower chamber 117 of the actuator 100 to the valve 115.

The valve 115 is further connected by a line 118 to a source of hydraulic fluid under pressure 119 and a reservoir of pressurised hydraulic fluid 120. The control valve 115 is also connected by a line 121 to an exhaust for fluid 122. The control valve 115 is controlled by electrical signals received through a line 123 from the processing means 40 of the apparatus.

The chamber 107 of the second cylinder 106 is connected to both the source of pressurised fluid 119 and the reservoir of pressurised fluid 120 via the line 110. The line 110 is not directly connected to the source of pressurised fluid 119 and the reservoir of pressurised fluid 120. Instead, the line 110 is connected to both the source 119 and the reservoir 120 via a regulating valve 124. The regulating valve 124 regulates the pressure of the fluid in line 110 to one tenth of the system pressure.

Figure 6:
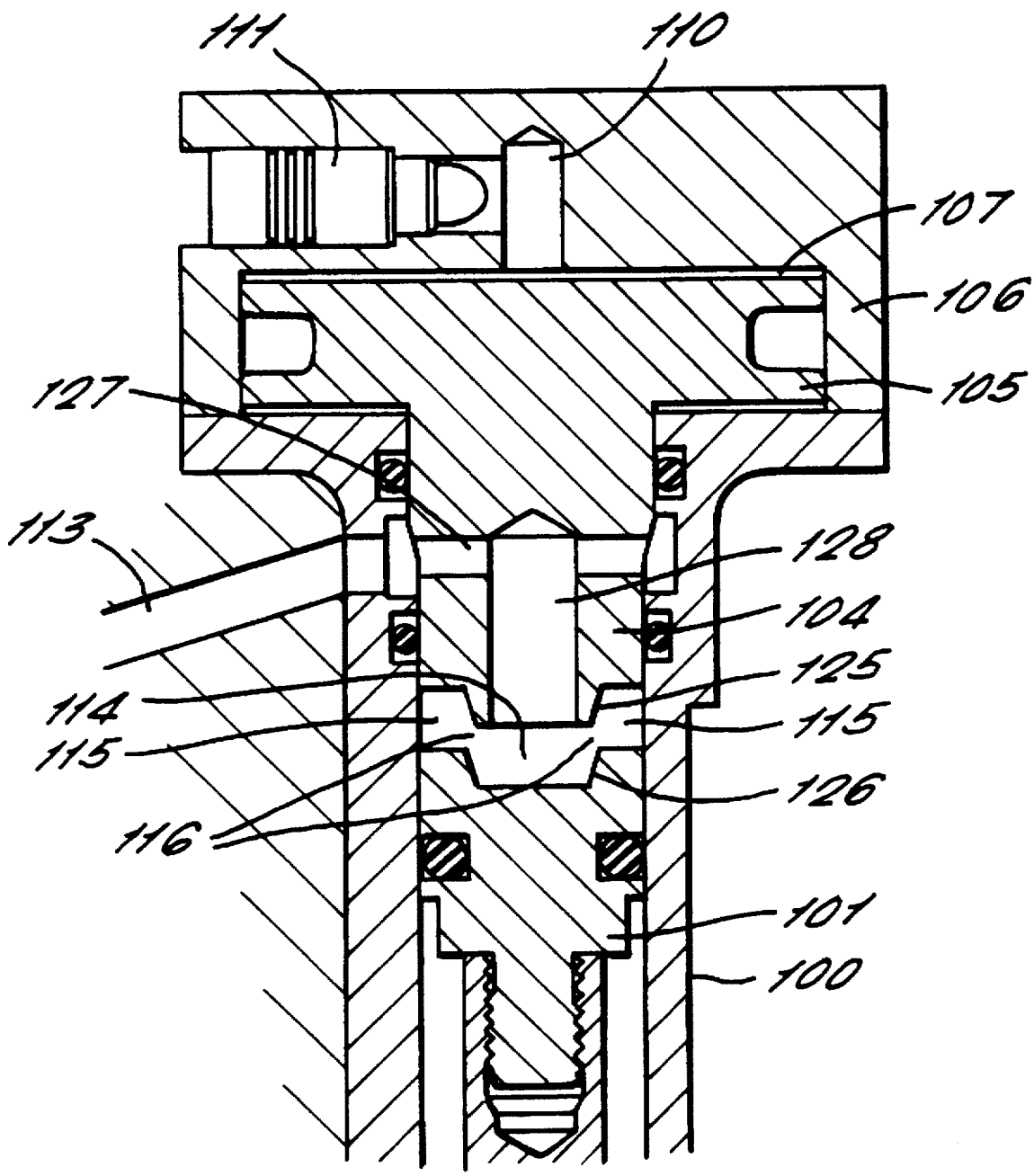
FIG. 6 is a cross-section of part of the hydraulic actuator of the second embodiment of the apparatus.

In FIG. 6 there can be seen a part cross-section of the actuator 100. In FIG. 6 there can be seen the movable end 104 connected to the piston 105, as well as the second cylinder 106, the chamber 107 and the supply line 110.

The resistance means of the second embodiment of the invention comprises the essential integers of a frusto-conical protrusion 125 on the lower surface of the movable end 104 and also the frusto-conical indentation 126 on the upper surface of the piston 101.

In normal operation of the actuator 100, as the piston 101 approaches the end 104 fluid flows freely out of the chamber 114 to the line 113 via cavities 127 and 128 in the movable end 104. However, as the piston 101 nears the movable end 104 the flow of fluid out of the actuator 100 to the line 113 becomes constricted. The lower surface of the movable end 104 and the upper surface of the piston 101 define an annular cavity 115. As the piston 101 moves towards the movable end 104, the flow of fluid out of the region 115 becomes restricted due to the narrow nature of the annular aperture 116 defined between the protrusion 125 and the uppermost surface of the piston 101.

As the piston 101 approaches nearer and nearer the movable end 104, the greater becomes the resistance offered to the flow of fluid out of the region 115. This arises since the constriction formed between the uppermost piston surface and the lowermost movable end surface becomes narrower and narrower. The progressively increasing resistance offered to the flow of fluid out of the actuator 100 progressively damps the motion of the piston 101 towards the movable end 104. The progressively increasing resistance allows the progressive deceleration of the motion of the valve 19 towards its associated valve seat. Unlike the first embodiment of the resistance means described above, the resistance means of the second embodiment progressively increases the resistance to the flow of fluid out of the actuator 100 and hence progressively increases the decceleration forces on the valve 19. In the first embodiment described above, the resistance offered to the flow of fluid out of the actuator 1 1 is determined by the orifice formed in the nozzle 35.

The second embodiment of the invention relies upon the fact that very little or no fluid is left between the piston 101 and the movable end 104 when the valve 19 is against its respective valve seat. Therefore adjustment means are provided which allow the movable end 104 to be brought into contact with the piston 101 when the valve 19 is against its respective valve seat.

The adjustment means comprises the line 110, the orifice 111 and the pressure regulating valve 124. When the pressure regulating valve 124 is operated, a supply of fluid under pressure is provided to the chamber 107 of the second cylinder 106. The flow of fluid into the chamber 107 is kept to a very low level by use of the orifice 111. By the introduction of fluid into the chamber 107 the piston 105 causes the end 104 to move down to mate with the piston 101.

Motion of the movable end 104 is kept to a minimum during operation of the actuator 100, since the nozzle 111 restricts any flow of fluid into or out of the chamber 107. Further, the compressibility of the fluid in the chamber 107 has negligible effects, since the piston 105 acts over a comparatively large area, whilst the volume of fluid contained within the chamber 107 is small.

The method of operation of the processing means 40 of the apparatus shall now be discussed, with reference to FIG. 3.

As mentioned before, signals corresponding to the crankshaft position and to the speed of revolution of the engine are input into the processing means. The signals are then processed using a "look-up table" with linear interpolation, in box 45. The "look-up table" is programmed into apparatus by the operator. The operator can in this way instruct the system to follow a particular cam shaft profile.

A position signal for the valve is input into a summing junction at 46 and is summed with the actual valve position as measured by the displacement measuring means. The resulting error signal is fed into a PID (Proportional, Integral, Differential) control system at 47. The output of the PID 47 is fed into a decision box 48. The decision box decides whether the control system requires the valve to move towards or away from the valve seat. In mathematical terms the decision box decides whether the drive signal is greater or less than zero. Depending upon whether the drive signal is greater or less than zero the processing means multiplies the drive signal by a constant GF or GB. This constant converts the position control signal into a signal controlling the servo-valve. Different scaling factors GF and GB are needed since the piston 16 has different surface areas on either side thereof, since it is attached to the rod 18 on one side and is attached to the rod 23 on the other side.

Whilst there has been described above a system in which the control valve 10 controls the flow of fluid into both chambers defined by the surfaces of the piston 16 and cylinder 17, the applicants envisage apparatus in which the flow of fluid into one chamber need only be controlled. If resilient means, such as a spring, are provided to bias the piston in one direction then control of the flow of fluid into one chamber and allow the control of the motion of the piston.

Whilst the system described above uses pressurised hydraulic fluid, the applicant envisages that compressed gas could also be used to cause motion of the piston 16. However, the use of hydraulic fluid is suited to the use of the apparatus in an internal combustion engine since pressurised hydraulic fluid is readily available in the form of oil pressurised by an oil pump powered by the output of the engine.

Whilst above the invention is described in its application to a reciprocating internal combustion engine, it should be appreciated that the invention could equally well be applied to any type of engine which uses valves to control the flow of fluid or gas therein or to any type of compressor which uses valve gears (e.g. reciprocating compressor).

It will be appreciated from the foregoing that the invention enables an operator to test the performance of different cam profiles when used in an engine or compressor without having to have the cam profiles machined and connected to the engine. The process therefore speeds the testing process for an engine or compressor as well as reducing costs.

We claim:

1. A method of testing an engine or compressor wherein a hydraulic piston and cylinder arrangement is provided to actuate an inlet valve, a control means is provided to control a flow of hydraulic fluid to the hydraulic piston and cylinder arrangement, and the inlet valve motion is varied by adjustment of the control means for controlling the hydraulic fluid, the method including the step of programming the control means for controlling the flow of hydraulic fluid with a program which instructs the control means to control the inlet valve motion such that the inlet valve motion corresponds to a particular valve motion which would result from the use of a particular camshaft in the engine or compressor to control the inlet valve motion.

2. A method of testing an engine or compressor as claimed in claim 1 which further includes the step of programming the control means successively with a plurality of different programs during testing of the engine or compressor, the different programs instructing the control means to control the valve motion such that the inlet valve motion corresponds to a motion that would result from the use of selected camshafts in the engine or compressor.

3. An apparatus for testing an engine or compressor, the apparatus comprising a valve control apparatus for controlling a valve means which opens and closes a port of the engine or compressor, wherein the valve control apparatus comprises:

an actuator which comprises a piston within a cylinder, which piston is connected to the valve means such that the a motion of the piston causes motion of the valve means;

processing means for deriving a stroke position of the engine or compressor;

position measurement means for measuring a position of the piston within the cylinder;

control means for controlling the actuator by controlling a flow of fluid into at least one chamber defined by surfaces of the piston and an interior surface of the cylinder; and wherein the control means controls the actuator to cause the valve means to open and close the port and wherein the control means operates with regard to the stroke position of the engine or compressor and in accordance with a program of instructions provided by a user of the apparatus, which program of instructions can be altered by the user as required.

4. Apparatus for testing an engine or compressor as claimed in claim 3 wherein a program of instructions is provided by the user such that the motion of the valve means corresponds to a motion that would result from the use of a particular camshaft in the engine or compressor to control the motion of the valve means.

5. Apparatus for testing an engine or compressor as claimed in claim 3 wherein the control means for controlling the actuator comprises a second processing means and a control valve controlled by the second processing means using electrical control signals, which the control valve can connect the chamber of the actuator to one of a source of pressurized fluid and a fluid exhaust.

6. Apparatus for testing an engine or compressor as claimed in claim 5 wherein the processing means controls the control valve by use of a signal and one of a closed loop position and velocity feedback control system wherein the signal is derived from the position measuring means.

7. Apparatus for testing an engine or compressor as claimed in claim 3 wherein the position measuring means for measuring the position of the piston with respect to the actuator cylinder comprises a displacement transducer connected to the piston which provides a first electrical signal indicative of the relative position.

8. Apparatus for testing an engine or compressor as claimed in claim 7 further comprising additional processing means for producing a second electrical signal representative of the rotational speed of the engine.

9. Apparatus for testing an engine or compressor as claimed in claim 8 wherein the additional processing means for producing the second electrical signal representative of the rotational speed of the engine comprises means for differentiating with respect to time a signal representative of the rotational position of the crankshaft.

10. Apparatus for testing an engine or compressor as claimed in claim 8 wherein the additional processing means controls the control valve having regard to the rotational speed of the engine as indicated by the second electrical signal.

11. Apparatus for testing an engine or compressor as claimed in claim 3 wherein the control means controls the flow of fluid into two chambers.

12. Apparatus for testing an engine or compressor as claimed in claim 3 wherein a resistance means is provided which resistance means increases the resistance offered to a flow of fluid out of the actuator as the actuator piston approaches at least one end of the cylinder.

13. A method of testing an engine or compressor comprising the steps of:

providing an apparatus for testing an engine or compressor including a valve control apparatus for controlling a valve means which opens and closes a port of the engine or compressor, wherein the valve control apparatus comprises an actuator which comprises a piston within a cylinder, which piston is connected to the valve means such that a motion of the piston causes motion of the valve means;

processing means for deriving a stroke position of the engine or compressor;

position measurement means for measuring a position of the piston within the cylinder;

control means for controlling the actuator by controlling a flow of fluid into at least one chamber defined by surfaces of the piston and an interior surface of the cylinder, wherein the control means controls the actuator to cause the valve means to open and close the port of the engine or compressor, and wherein the control means operates with regard to the stroke position of the engine or compressor;

programming the apparatus with a program of instructions for causing the valve means to move under the control of the actuator in a manner corresponding to a motion that would result from use of a particular camshaft in the engine or compressor; and operating the engine or compressor with the apparatus installed and controlling the motion of the valve means in accordance with the program of instructions.

14. A method of testing an engine or compressor wherein a hydraulic piston and cylinder arrangement is provided to actuate an exhaust valve, a control means is provided to control a flow of hydraulic fluid to the hydraulic piston and cylinder arrangement and the exhaust valve motion is varied by adjustment of the control means for controlling the hydraulic fluid, the method including the step of programming the control means for controlling the flow of hydraulic fluid with a program which instructs the control means to control motion of the exhaust valve such that the exhaust valve motion corresponds to a particular valve motion which would result from the use of a particular camshaft in the engine or compressor to control the exhaust valve motion.

15. A method or testing an engine or compressor as claimed in claim 14 which further includes the step of programming the control means successively with a plurality of different programs during testing of the engine or compressor, the different programs instructing the control means to control the exhaust valve motion such that the exhaust valve motion corresponds to a motion that would result from the use of respective different camshafts in the engine or compressor.

* * * * *

UNITED STATES PATENT AND TRADEMARK OFFICE
CERTIFICATE OF CORRECTION

PATENT NO. : 5,455,772
DATED : October 3, 1995
INVENTOR(S) : Burke et al.

It is certified that error appears in the above-indentified patent and that said Letters Patent is hereby corrected as shown below:

Column 8, line 55, "the" should be deleted.

Signed and Sealed this

Ninth Day of July, 1996

Attest:

BRUCE LEHMAN

Attesting Officer     Commissioner of Patents and Trademarks